United States Patent

[11] 3,618,828

[72] Inventor Albert A. Schinella
 Concord, N.H.
[21] Appl. No. 44,007
[22] Filed June 8, 1970
[45] Patented Nov. 9, 1971
[73] Assignee Humphreys Corporation
 Bow, N.H.

[54] POWDER FEEDER
 10 Claims, 3 Drawing Figs.
[52] U.S. Cl............................................... 222/193,
 222/196, 222/457
[51] Int. Cl............................................... B67d 5/54
[50] Field of Search........................................ 222/192,
 193, 199, 200, 457, 476, 195, 196

[56] References Cited
 UNITED STATES PATENTS
 2,779,510 1/1957 Wilson et al.................. 222/196 X
 3,149,759 9/1964 Manleg......................... 222/193
 3,278,090 10/1966 Wahl............................ 222/199

Primary Examiner—Samuel F. Coleman
Assistant Examiner—Larry H. Martin
Attorney—Willis M. Ertman ABSTRACT: A powder feeder includes a feeding structure having a receiving surface, a feeding surface and a discharge channel. A drive vibrates the feeding surface to move particles along that surface from the receiving surface to the discharge channel. A supply hopper has an outlet channel above and spaced from the receiving surface and disposed between the outlet channel of the supply hopper and the receiving surface of the feeder structure is a control member that has a port aligned with and of smaller dimension than the outlet channel of the supply hopper.

3,618,828

POWDER FEEDER

SUMMARY OF INVENTION

This invention relates to feeding apparatus and more particularly to apparatus for feeding a variety of powders continuously and reliably.

In many processes, it is desirable to feed one or more materials at a continuous uniform rate, uniformity of rate being particularly important where materials are to be mixed together in predetermined ratios. Where a material is a powder (for example, pulverulent, granular or particulate in form), it is often difficult to feed such material at a predetermined uniform rate, particularly in a continuous process. Further, it is frequently difficult to change the rate of feed and drastic changes in construction often must be made before significant changes in feed rate can be achieved.

Accordingly it is an object of this invention to provide a novel and improved feeding apparatus for feeding particulate materials.

Another object of the invention is to provide a novel and improved powder feeder for feeding a variety of particulate materials so constructed and arranged that the rate of feed can be maintained at a predetermined desired constant value.

Another object of the invention is to provide a novel and improved feeder for feeding predetermined quantities of particulate material in which the quantity fed may be varied simply and accurately over a relatively wide range.

Still another object of the invention is to provide a novel and improved feeder arrangement in which powder is fed at a continuous rate and entrained in a gaseous stream.

In accordance with the invention there is provided a feeding apparatus which includes a receiving surface, a feeding surface and a discharge channel, a vibratory drive for moving the feeding surface to move particles along the feeding surface along a path from the receiving area to the discharge channel. A supply hopper is disposed above and has an outlet channel above and spaced from the receiving surface. Disposed between the outlet channel of the supply hopper and the receiving surface of the feeder is a control member that has a port aligned with and of smaller dimensions than the outlet channel of the supply hopper.

In a preferred embodiment, the control member is a semispherical cup that is secured to the outlet channel of the supply hopper. The feeder apparatus is mounted within a chamber that is pressurized so that the particulate material fed through the discharge channel may be entrained in a suitable carrier gas. The vibratory feeder surface is angularly vibrated by an electrical drive so that the particles move in a generally outwardly spiral path from the receiving surface across the feeding surface to the discharge channel. A variety of powders can be continuously fed at a uniform rate independent of the load in the supply hopper by apparatus constructed in accordance with the invention at rates from a few ounces per hour to hundreds of pounds per hour or more. The powders fed range from light powders such as wheat flour to heavy powders such as tungsten.

Other objects, features and advantages of the invention will be seen as the following description of a particular embodiment progresses, in conjunction with the drawings, in which.

DESCRIPTION OF PARTICULAR EMBODIMENT

Figure 1:
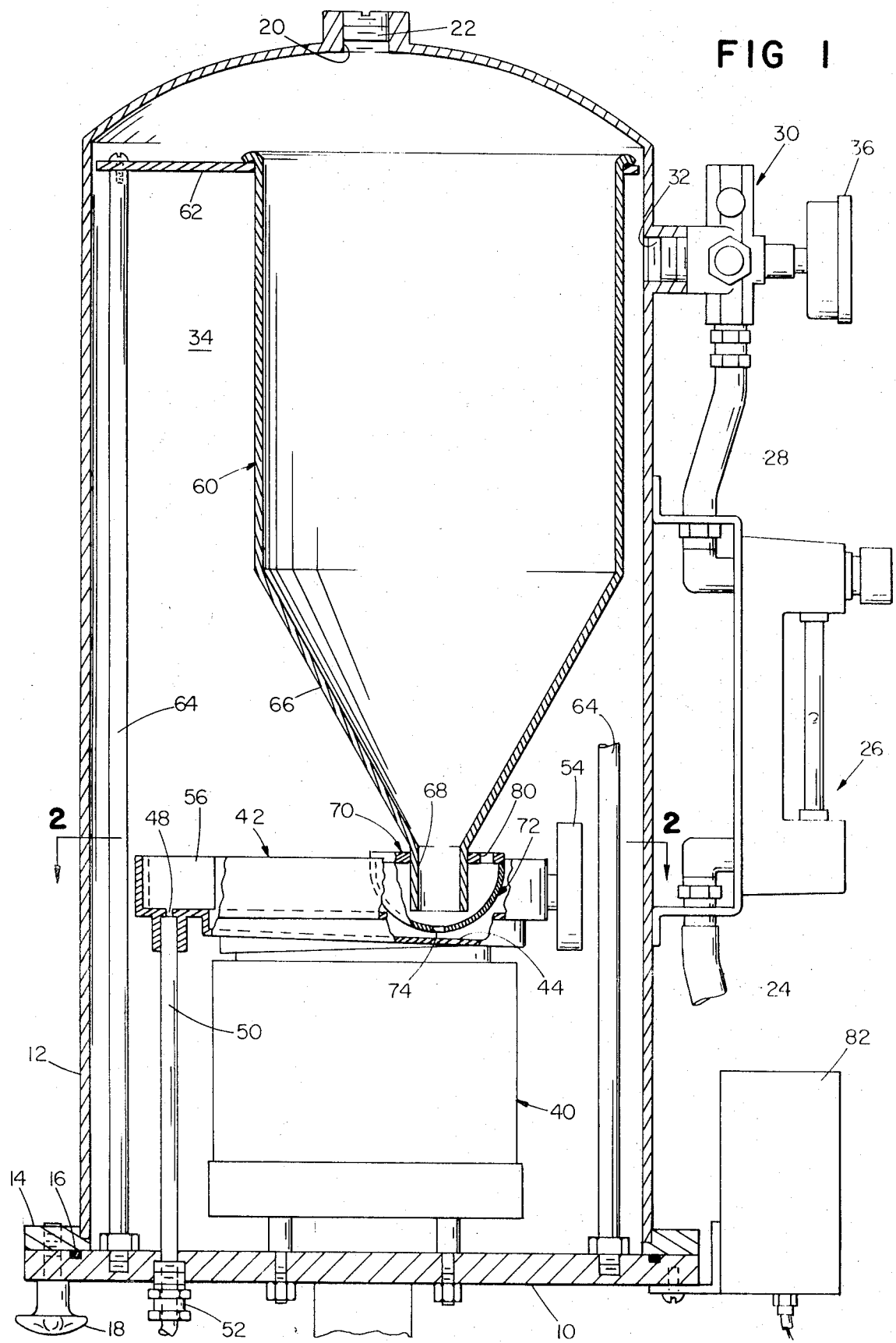
FIG. 1 is a side elevational view, in section, of feeding apparatus constructed in accordance with the invention.
Figure 2:
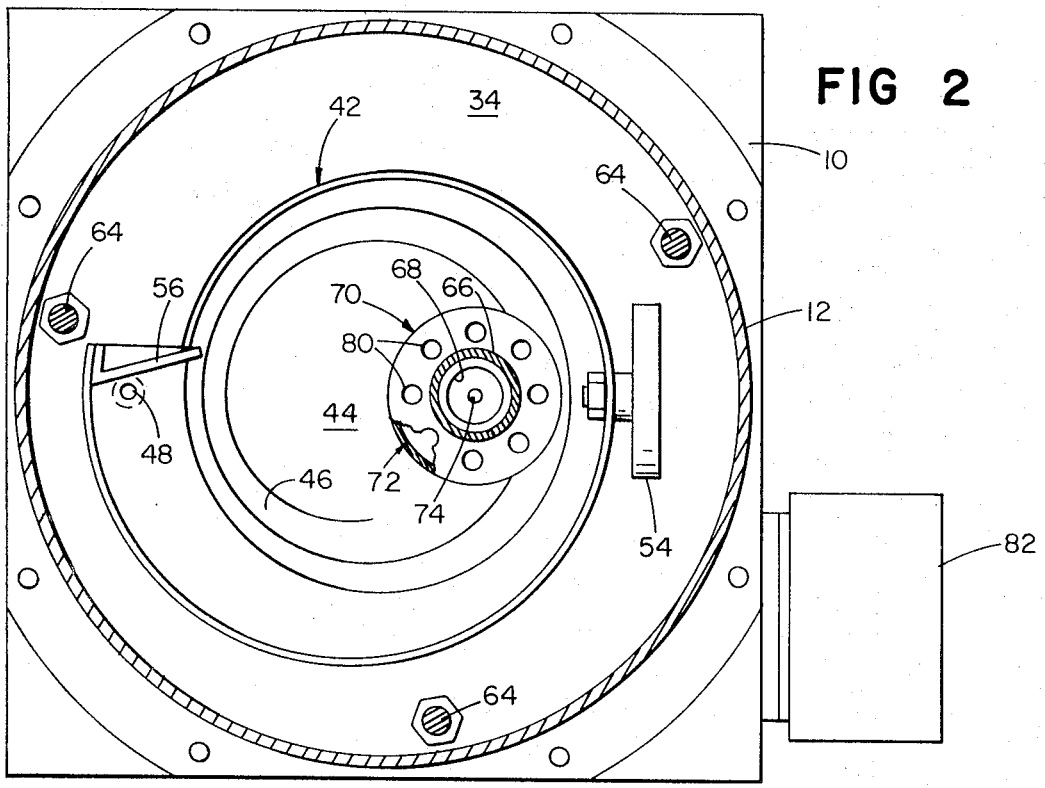
FIG. 2 is a sectional view taken along the line 2—2 of FIG. 1.
Figure 3:
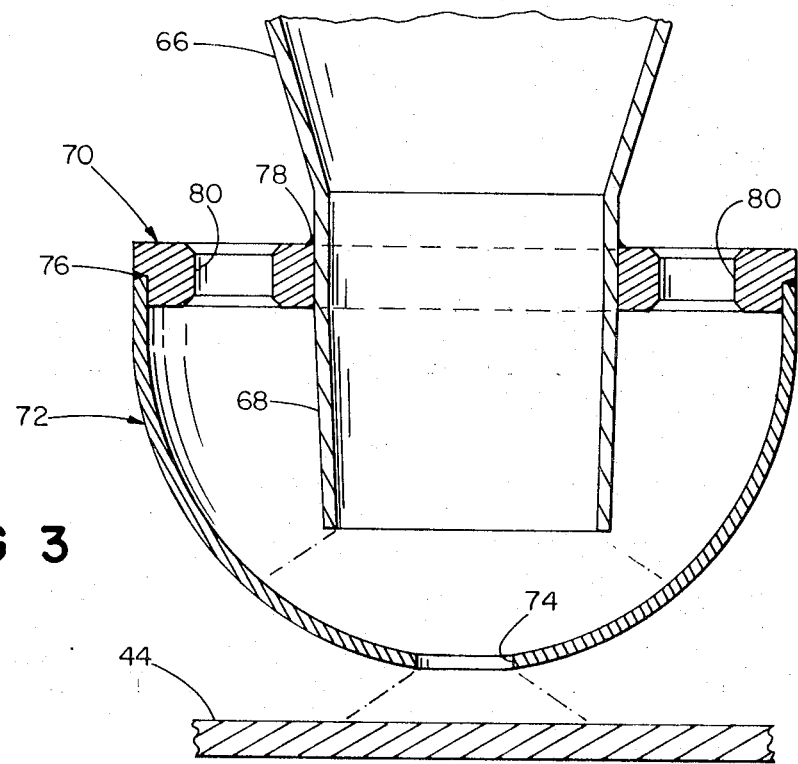
FIG. 3 is an enlarged sectional view showing details of components of the feeding apparatus.

With reference to FIG. 1, the feeding apparatus includes a baseplate 10 on which is mounted a cylindrical tank 12, 10 inches in diameter and 20 inches high. Flange 14 is secured to the lower end of tank wall 12 and mates with an O-ring 16 received in a groove in baseplate 10 to provide a seal when the flange 14 is secured against the baseplate by clamp knobs 18. In the domed top of the tank is an entrance port 20 that may be sealed with threaded plug 22. Secured to the wall of tank 12 is a gas flow assembly, gas being introduced through hose 24 for passage through flowmeter 26 and hose 28 to valve assembly 30 for introduction through port 32 into the chamber 34 defined between tank 12 and baseplate 10. Gauge 36 is provided to provide an indication of the pressure in chamber 34.

Supported from baseplate 10 is a vibratory feeder unit that includes drive 40 and bowl 42 that is 7½ inches in diameter and weighs 1 pound, 14½ ounces. Bowl 42 is clamped to a plate in drive 40 that is driven with an angular motion. Bowl 42 includes a receiving surface 44 and an inclined helical feeding surface 46 which extends from receiving surface 44 to a discharge channel defined by port 48. Barrier plate 56 is disposed beyond port 48 and returns powder that does not pass through port 48 to surfaces 44 and 46 for recirculation. A discharge hose 50 extends from port 48 through baseplate 10 via coupling 52. Weight 54 secured to the feeder bowl 42 is used to modify the amplitude of motion of the feed bowl 42 and hence the feed rate.

A feed hopper 60 is supported on ring 62 which in turn is supported by rods 64 from the baseplate 10. The hopper has a lower funnel portion 66 which tapers to a discharge channel 68 that has an inner diameter of seven-eighths inch to which is secured a support disc 70. Secured in turn to disc 70 is a control cup 72 that in this embodiment has a diameter of 2½ inches. A port 74, five-sixteenths inch in diameter, is formed in the lower center of the control cup 72. The lip of the control cup is brazed to support ring 70 at joint 76 and a similar braze 78 is formed between ring 70 and hopper channel 68, so that port 74 is located three-eighths inch from the end of channel 68. Holes 80 in support disc 70 permit the interior of the control cup 72 to be at the same pressure as the environment surrounding that cup. The spacing of the lower surface of control cup 72 from receiving surface 44 is determined by the position of support rods 64. In the feeding of a heavy powder such as tungsten or steel, this dimension may be set to be about one-sixteenth inch while in feeding a lighter powder such as silica or aluminum oxide, this dimension may be in the order of three-sixteenths inch.

In operation, hopper 60 is filled with the powder to be fed and the valve 30 is adjusted to the desired gas flow rate as indicated by flowmeter 26 to provide a flow of carrier gas through chamber 34 and discharge tube 50. Control 82 is then energized to operate feeder drive 40 to impart angular vibratory motion to bowl 42. The powder flows from channel 68 into cup 72 and covers port 74 and then flows through port 74 at a controlled rate onto receiving surface 44. The powder fed onto receiving surface 44 is moved along helical feeder surface 46 to outlet port 48 and there entrained in the carrier gas for passage through tube 50 to the point of use. This controlled rate of flow of powder from hopper 60 to outlet port 48 is such that a substantially constant load is maintained on bowl structure 42 and thus the amplitude and rate of angular motion is maintained substantially constant so that the powder flows through tube 50 at a constant rate.

A variety of powders have been fed at uniform rates with this apparatus including extremely fine, light powders such as wheat flour (10–30 microns in size), that material being uniformly fed at different rates over the range from 1–12 pounds per hour. Auxiliary devices to assist the flow of difficult to feed powders, such as a small diameter rod that extends through hopper 60, channel 68, and port 74 so that its end rests on surface 44 or a mechanical agitator for the discharge channel 68 may be used where desired. The following table indicates other types of powders that have been fed with this apparatus, and settings of the feeder apparatus and resulting feed rates:

| Power material | Mesh size | Setting spacing between 44 and 72, in. | Power setting of control 82, percent | Weight 54 (4 oz.) | Feed rate, lb./hr. |
| --- | --- | --- | --- | --- | --- |
| Silica | −45+70 | 1/16 | 100 | No | 60 |
| Do | −45+70 | 1/16 | 75 | No | 50 |
| Do | −45+70 | 1/16 | 50 | No | 40 |
| Do | −45+70 | 1/16 | 25 | No | 25 |
| Do | −45+70 | 3/16 | 100 | No | 90 |
| Do | −45+70 | 3/16 | 100 | Yes | 9 |
| Aluminum oxide | −200+325 | 3/16 | 100 | No | 15 |
| Steel | −100+200 | 1/16 | 100 | Yes | 6 |
| Do | −100+200 | 1/16 | 100 | No | 60 |
| Do | −100+200 | 9/16 | 100 | No | 700 |
| Tungsten | −40 | 1/16 | 100 | Yes | 12 |

Thus it will be seen that a wide range of powder feed rates can be obtained through simple adjustments of this apparatus. In each case powder feed was at a uniform rate and continuous. While a particular embodiment of the invention has been shown and described, various modifications thereof will be apparent to those skilled in the art and it is not intended that the invention be limited to the disclosed embodiment or to details thereof and departures may be made therefrom within the spirit and scope of the invention.

What is claimed is:

1. Apparatus for feeding powder material comprising a feeder structure having a receiving surface, a discharge channel, and a feeding surface providing a transfer path between said receiving surface and said discharge channel, a drive for said feeder structure for vibrating said feeder structure to move powder from said receiving surface along said feeding surface to said discharge channel, a supply hopper disposed above said feeder structure, said supply hopper including an outlet channel spaced above said feeding surface, and a control member disposed between said outlet channel and said receiving surface, said control member having a port smaller in dimension than said outlet channel and spaced from both said outlet channel and said receiving surface, said control member cooperating with said outlet channel and said feeding surface to control the amount of powder on said feeding surface so that said vibratory drive causes the powder to move at a uniform rate across said feeding surface and through said discharge channel.

2. The apparatus as claimed in claim 1 wherein said control member is a cup secured to said supply hopper.

3. The apparatus as claimed in claim 2 wherein said cup is hemispherical in configuration and said port is aligned with said outlet channel.

4. The apparatus as claimed in claim 1 wherein said feeder structure and said supply hopper are disposed in a chamber and further including means for supplying the chamber with a carrier gas for entraining the powder fed to said discharge channel.

5. The apparatus as claimed in claim 1 wherein said drive imparts rotary motion to said feeding surface for moving said powder in a generally outward spiral path along said feeding surface from said receiving surface to said discharge channel.

6. The apparatus as claimed in claim 1 wherein the spacing of said control member from said receiving surface is less than the flow control dimension of said port.

7. The apparatus as claimed in claim 6 wherein said control member is a cup secured to said supply hopper, said cup having a continuous lip that is disposed above the lower end of said discharge channel.

8. The apparatus as claimed in claim 7 wherein said drive imparts rotary motion to said feeding surface for moving said powder in a generally outward spiral path along said feeding surface from said receiving surface to said discharge channel.

9. The apparatus as claimed in claim 8 wherein said feeder structure and said supply hopper are disposed in a chamber and further including means for supplying the chamber with a carrier gas under positive pressure for entraining the powder fed to said discharge channel.

10. The apparatus as claimed in claim 9 wherein said cup is hemispherical in configuration and said port is aligned with said outlet channel.

* * * * *